United States Patent
Silakov et al.

(10) Patent No.: US 12,333,296 B1
(45) Date of Patent: *Jun. 17, 2025

(54) SYSTEMS AND METHODS FOR USER-CONTROLLED DEPLOYMENT OF SOFTWARE UPDATES

(71) Applicant: Virtuozzo International GmbH, Schaffhausen (CH)

(72) Inventors: Denis Silakov, Moscow (RU); Igor Bazhitov, Moscow (RU)

(73) Assignee: Virtuozzo International GmbH, Schaffhausen (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/474,029

(22) Filed: Sep. 25, 2023

Related U.S. Application Data (63) Continuation of application No. 17/137,054, filed on Dec. 29, 2020, now Pat. No. 11,768,672.

(51) Int. Cl.
| | |
|---|---|
| *G06F 8/65* | (2018.01) |
| *G06F 8/71* | (2018.01) |
| *G06F 9/4401* | (2018.01) |
| *G06F 11/30* | (2006.01) |
| *G06F 11/34* | (2006.01) |

(52) U.S. Cl.
CPC .............. *G06F 8/65* (2013.01); *G06F 8/71* (2013.01); *G06F 11/302* (2013.01); *G06F 11/3495* (2013.01); *G06F 9/4401* (2013.01)

(58) Field of Classification Search
CPC . G06F 8/65; G06F 8/71; G06F 11/302; G06F 11/3495; G06F 9/4401; G06F 8/60; G06F 8/70; G06F 11/30; G06F 11/34
USPC ........................................................ 717/172
See application file for complete search history.

(56) References Cited

U.S. PATENT DOCUMENTS

| | | | |
|---|---|---|---|
| 10,146,524 B1 * | 12/2018 | Killmon | G06F 8/65 |
| 10,282,193 B1 * | 5/2019 | Lanner | G06F 8/65 |
| 2018/0131574 A1 * | 5/2018 | Jacobs | H04L 43/0817 |
| 2019/0146774 A1 * | 5/2019 | Moore | H04L 41/082 717/172 |
| 2020/0241868 A1 * | 7/2020 | Murthy | G06F 11/004 |
| 2020/0249928 A1 * | 8/2020 | Zeng | G06F 9/5038 |
| 2020/0257517 A1 * | 8/2020 | Seater | G06F 1/3206 |

* cited by examiner

*Primary Examiner* — Bradley A Teets
*Assistant Examiner* — Zengpu Wei
(74) *Attorney, Agent, or Firm* — ArentFox Schiff LLP; Michael Fainberg (57) ABSTRACT

Disclosed herein are systems and methods for updating software object instances on a plurality of nodes. An exemplary method may comprise monitoring a software repository for an update to the software object instance installed on the plurality of nodes. In response to detecting the update, the method may comprise initiating installation of the update to the software object instance on a first subset of the plurality of nodes in accordance with an installation schedule. The method may comprise determining whether a functionality or performance issue in the software object instance or a respective node of the first subset was detected subsequent to updating the software object instance. In response to determining that the functionality or performance issue was not detected, the method may comprise updating the software object instance on a second subset of the plurality of nodes in accordance with the installation schedule.

21 Claims, 8 Drawing Sheets

SYSTEMS AND METHODS FOR USER-CONTROLLED DEPLOYMENT OF SOFTWARE UPDATES

CROSS-REFERENCE TO RELATED APPLICATIONS

This application is a continuation and claims the benefit of U.S. Non-Provisional application Ser. No. 17/137,054, filed Dec. 29, 2020, which is herein incorporated by reference.

FIELD OF TECHNOLOGY

The present disclosure relates to the field of software updates, and, more specifically, to systems and methods for automatic user-controlled deployment of software updates.

BACKGROUND

Most software developers periodically release updates for their products where they fix known issues and introduce new functionality. But besides new features and fixes, these updates may contain undesirable effects such as new bugs and performance degradation. That is why sometimes users prefer not to update all instances of the product at once, but instead perform this process gradually (e.g., update products only on certain devices, and after some time update the others). However, users still have to perform many actions manually to realize the gradual update installation.

Software developers are also interested in thorough testing of their updates and different tools exist allowing them to perform staging updates (e.g., first, release software update to a limited set of customers, then after some delay—to another set of customers, etc.). In this scenario, it is the developer rather than the customer who controls update distribution and installation. Approaches used by software developers are too generic, still require substantial manual input, and cannot take into account specific needs of every customer. In addition, customers have more control over environments where the products are run and can perform additional actions that cannot be run from a developer's side such as evaluating update success.

Therefore, there is a need for methods and systems for automatic user-controlled deployment of software updates.

SUMMARY

To address these shortcomings, aspects of the disclosure describe methods and systems for updating software object instances on a plurality of nodes. The method may comprise monitoring a software repository for an update to the software object instance installed on the plurality of nodes. In response to detecting the update, the method may comprise initiating installation of the update to the software object instance on a first subset of the plurality of nodes in accordance with an installation schedule. The method may comprise determining whether a functionality or performance issue in the software object instance or a respective node of the first subset was detected subsequent to updating the software object instance. In response to determining that the functionality or performance issue was not detected, the method may comprise updating the software object instance on a second subset of the plurality of nodes in accordance with the installation schedule.

In some aspects, initiating the installation of the update to the software object instance on a first subset of the plurality of nodes comprises sending corresponding commands to update agents on the plurality of nodes.

In some aspects, in response to determining that the functionality or performance issue was detected, the method may comprise not updating the software object instance on the second subset of the plurality of nodes.

In some aspects, in response to determining that the functionality or performance issue was detected, the method may comprise reverting the software object instance on the first subset of the plurality of nodes to a version prior to the update.

In some aspects, in response to determining that the functionality or performance issue was detected, the method may comprise notifying a user of the functionality or performance issue.

In some aspects, the method may comprise receiving, from a user, the installation schedule that indicates a time latency between updating the software object instance on the first subset and updating the software object instance on the second subset.

In some aspects, the method may comprise receiving, from a user, an indication of which nodes of the plurality of nodes are included in the first subset and which nodes of the plurality of nodes are included in the second subset.

In some aspects, determining whether the functionality or performance issue was detected further comprises performing a health check of the software object instance or nodes of the first subset by extracting attributes of the software object instance or the nodes of the first subset over a period of time subsequent to updating the software object instance, and comparing the attributes of the software object instance or the nodes of the first subset to criteria of health checker rules, wherein the health checker rules indicate whether the functionality or performance issue exists.

In some aspects, the method may comprise determining whether the functionality or performance issue in the software object instance or a respective node of the second subset was detected subsequent to updating the software object instance, and in response to determining that the functionality or performance issue was not detected, updating the software object instance on a third subset of the plurality of nodes in accordance with the installation schedule.

In some aspects, the method may comprise notifying a user when a reboot of at least one node of the plurality of nodes is needed, and rebooting the at least one node of the plurality of nodes subsequent to updating the software object instance on the at least one node.

It should be noted that the methods described above may be implemented in a system comprising a hardware processor. Alternatively, the methods may be implemented using computer executable instructions of a non-transitory computer readable medium.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and computer program product for updating software object instances on a plurality of nodes. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
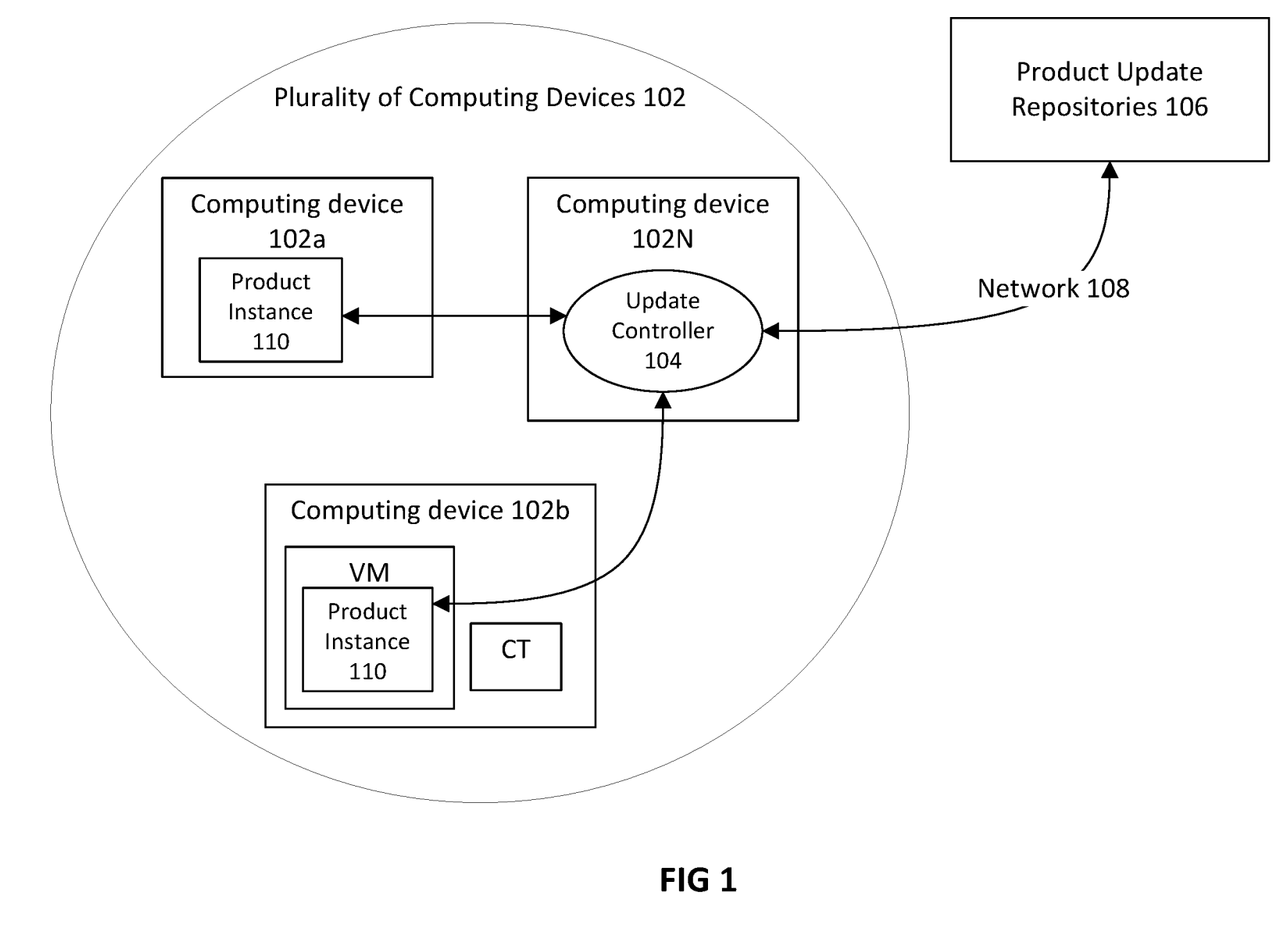
FIG. 1 is a block diagram illustrating a system for gradually updating a software object instance on a plurality of nodes.

FIG. 1 is a block diagram 100 illustrating a system (e.g., controller 104 on a computing node 102N) for gradually updating software object instances on a plurality of nodes. In diagram 100, a plurality of computing devices 102 comprises a plurality of computing devices 102a-102N. Each computing device may have a software object instance (used interchangeably with product instance 110). In other words, the software object instance may be installed on a node, wherein a node may be a physical computing device, a virtual machine (VM), a system container, an application container, etc. For example, in an exemplary aspect, product instance 110 is installed on the main operating system (OS) of a computing device (e.g., 102a). In an exemplary aspect, product instance 110 is installed directly on the hardware of a computing device (e.g., may be an operating system (OS), etc.). In some aspects, product instance 110 may be installed in a virtual machine (VM) on a computing device (e.g., 102b). In some aspects, product instance 110 may be installed in a container (CT) on a computing device (e.g., 102b).

The present disclosure describes an automated service for gradually update (used interchangeably with upgrade) all product instances once a new update is released. In one aspect, the service is controlled and configured by a user (e.g., a customer) and will not require manual intervention to perform gradually update. In one aspect, the service e.g., which works on a customer's side. In an exemplary aspect, a plurality of computing devices 102 has an update controller 104 (or several update controllers), which monitors for software updates on product update repositories 106 (e.g., on a software provider's side). This monitoring may occur over network 108 (e.g., the Internet). Update controller 104 is responsible for deploying found updates to the product instances on nodes, e.g., on the plurality of computing devices 102.

In one aspect, computing devices of the plurality of computing devices 102 (e.g., the computing devices of the user) do not look for updates at product update repositories 106. Instead, a dedicated update controller 104 is set up on at least one computing device (e.g., 102N) of plurality of computing devices 102. In some aspects, update controller 104 may run on a node, (e.g., directly on a physical machine, or inside of a container (CT), or a virtual machine (VM), etc.). In some aspects, update controller 104 may be distributed on multiple computing devices (or on multiple nodes). In some aspects, several update controllers 104 can run simultaneously on multiple computing devices (or on multiple nodes). Update controller 104 monitors for new updates (e.g., in the product update repositories 106) and initiates installation of the updates to product instances on nodes in accordance with certain policies, an installation schedule, etc.

Figure 2:
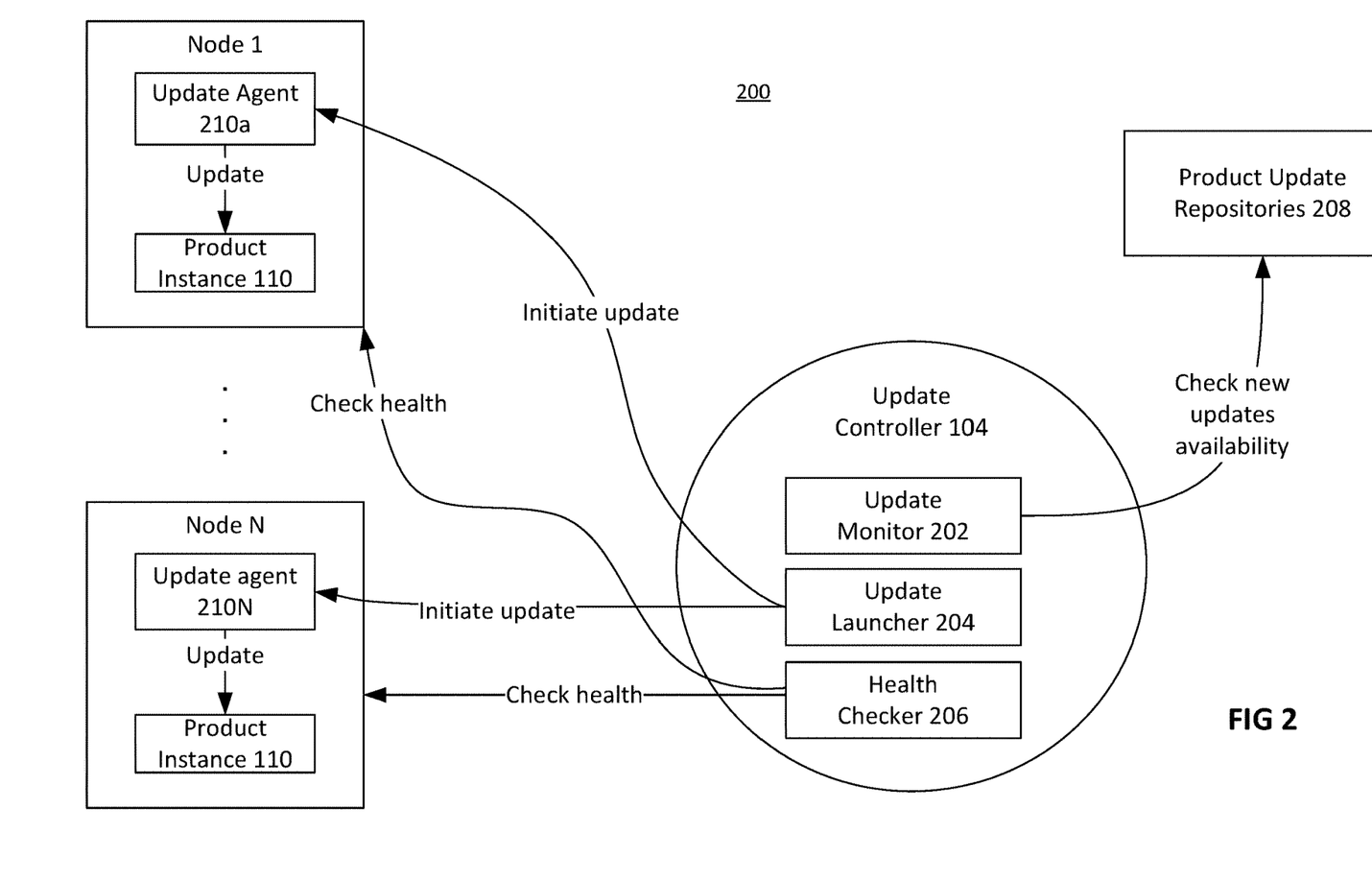
FIG. 2 is a block diagram illustrating an update controller.

FIG. 2 is a block diagram 200 illustrating an update controller actions and components. Update controller 104 may include multiple components including an update monitor 202 that monitors (e.g., checks update availability) whether a new update is available in product update repositories 208 (e.g., on a server storing the product updates), update launcher 204 that initiates installation of new updates to the product instances on the nodes (e.g., on nodes of a customer), and health checker 206 that evaluates the health of a node after an update.

In one aspect, a centralized system is created, where update controller 104 checks for available updates, initiates updates on some nodes, tracks update versions for each node, and determines whether the update led to functionality or performance issues. Update controller 104 tracks the latest update installations on every node in plurality of computing devices 102 and queries the server storing the product updates (e.g., product update repositories 208) for whether a newer update is available. In one aspect, a node does not have to check for updates, and may just wait for the command from update controller 104. This helps to avoid issues in gradual update related to situations when different nodes have different versions, and correspondingly see different updates (e.g., be unaware of certain updates).

In some aspects, every product instance 110 is accompanied by an update agent 210 (a-N), which is configured to update that particular product instance. The update agents communicate with the update controller. The agents 210 may be "active" and periodically ask controller 104 if it is time for a particular product instance to be updated, or may be "passive" and wait for controller 104 to invoke them for deploying a product update. In one aspect, one update agent (e.g., 210a) manages updates for one product instance (e.g., product instance 110 on node 1). In another aspect, one update agent manages updates for multiple product instances. In yet another one aspect, each node may contain only one product instance and have only one update agent. In some aspects, the update agent is installed on the same node as the product instance (or at least on the same computing device). In some other aspects, the update agent communicates with the node, where the product instance is installed, via a network.

In one aspect, a user installs an update agent on nodes (different possibilities are allowed: the user may install the update agent, or during product installation, the user may mark/set up product settings so that all updates are made via the update agent; moreover in some cases for each product instance there may be a separate update agent corresponding only to this product instance). The update agent will update (or revert, or provide information for the health check, etc.) the corresponding product instance(s) in response to receiving a command from the update controller. In one aspect, the update agent may receive the update file from the update controller; in another aspect, the update agent may, in response to receiving a command from the update controller, go to the repository and find the update files specified by the update controller.

Figure 3:
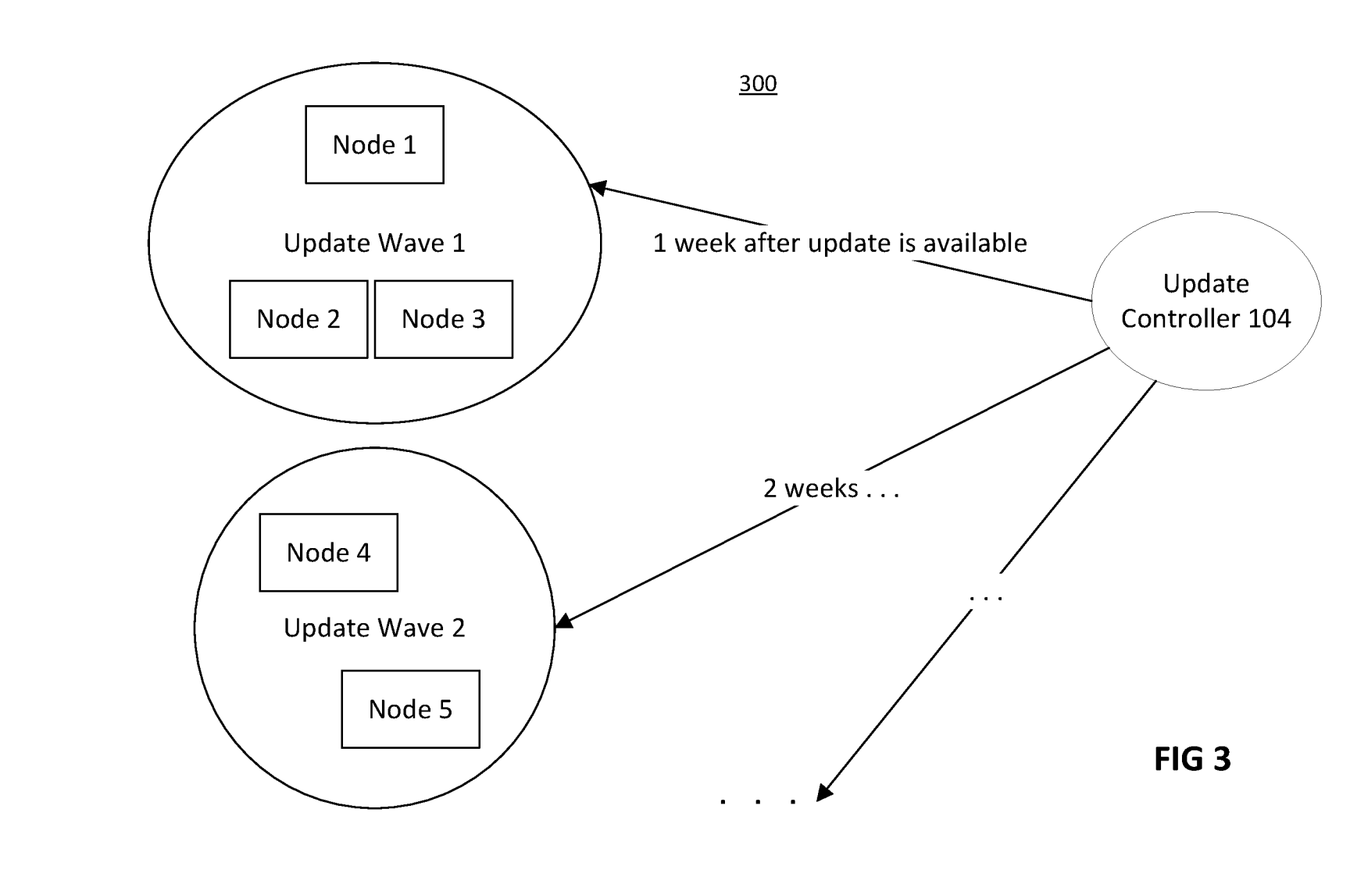
FIG. 3 is a block diagram illustrating examples of update waves and time latencies.

In one aspect, product instances (or nodes) are grouped, and the update controller initiates updates of the product instances of one group as one wave. Updates in one group may be sequential or may be simultaneous. For example, the first wave of updates may start at a first predefined time since an new update is available; the second wave of updates may start at a second predefined time since an new update is available; and so on. These times may be set by user, or computed based on an update type (e.g., more time between two waves may be needed for an upgrade of a product to next version on, and less time between security updates), node type (higher latency foe physical servers, lesser for VMs), etc., FIG. 3 is a block diagram 300 illustrating examples of update waves and time latencies. In diagram 300, a plurality of computing devices are grouped together into at least two subsets. The first subset includes nodes 1-3 and the second subset includes nodes 4-5. Another subset may include nodes 6-N and so on. Each subset is associated with an update wave. The distribution of the nodes for the waves may be defined by the user, or computed according to predefined percentages of nodes, which shall be affected by each wave. For example, the first subset is associated with update wave 1 and the second subset is associated with update wave 2. Update controller 104 may refer to an installation schedule that indicates time latencies of each wave, the number of waves (and so the number of subsets), and the distribution of the nodes for each wave (e.g., the members of each subset). The installation schedule may further specify when each update wave occurs. For example, some nodes may be updated a week after an update release (in update wave 1) and another set of nodes may be updated 2 weeks after. In other examples, any other time latencies may be used. With every wave, only a corresponding subset of product instances is updated and after every wave, there is a delay before the other wave happens. That is why the update is called gradual-only a part of product instances is updated at each wave.

Figure 4:
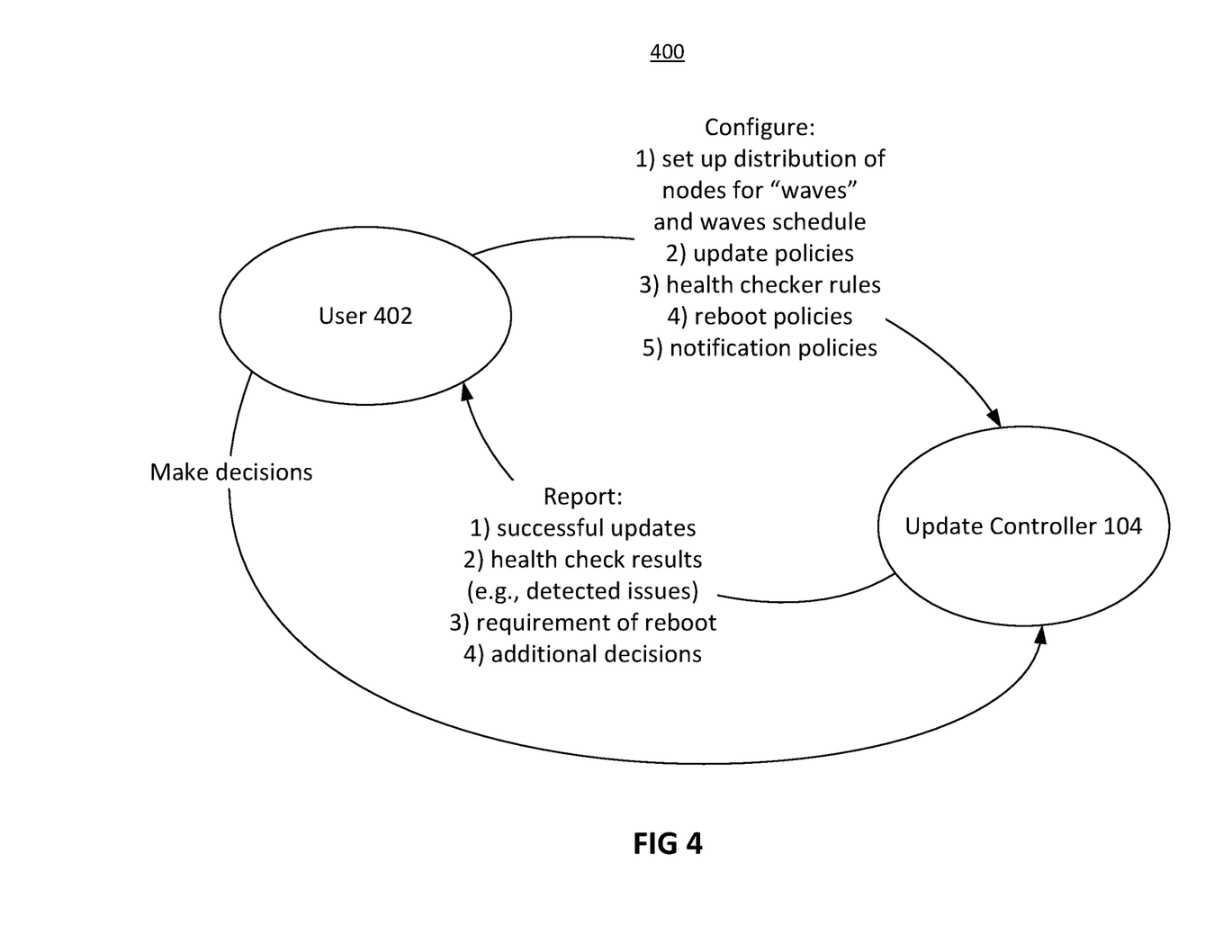
FIG. 4 is a block diagram illustrating interactions between an update controller and a user.

FIG. 4 is a block diagram 400 illustrating interactions between update controller 104 and user 402. User 402 may be an administrator of the plurality of computing devices 102. Accordingly, user 402 may configure the installation schedule, distribution of nodes (or product instances) in the waves, and update controller's policies. In one aspect, the user 402b may specify particular instances that should be updated in given waves. In one aspect, the user 402b may just specify percent of all instances that should be updated by different waves. User 402 may also configure the waves schedule including wave periods or wave latencies (e.g., after which time after update becomes available each wave shall be started) and various policies in the installation schedule. Policies may be associated with health checks, time, reboots, and notifications (e.g., the user 402 may check (e.g., turn "on" or "off") or set up the list of events in case of which notifications shall be sent). For different types of nodes and different types of updates different settings may be used.

In some aspects, a policy may comprise a setting that generates a notification (or reboots a node, or starts additional heath check, or restarts a VM or a container, or restarts a product instance, etc.) when an event corresponding to a policy occurs. Examples of events may be a successful installation of an update on a node, an unsuccessful installation of an update, a need for a reboot of a particular node, health checker results, a detection of an issue, a need of a decision of an user, etc.

In one aspect, wave schedules may indicate when each update wave should be started (e.g., with which latency from an update detection) and/or the time latency between each update wave. Example temporal policies include "if current time=1:00 am on a Monday, initiate update wave 1," "if current time=1:00 am on a Tuesday, initiate update wave 2," "if duration between end of update wave 1 and current time is greater than 24 hours, initiate update wave 2," etc.

In one aspect, reboot policies, for example, may indicate whether, in case where installing of an update (or upgrade) implies a node reboot, the nodes shall be rebooted automatically and immediately or only upon approve of a user 402.

In one aspect, user 402 may also establish health checker rules/policies for update controller 104. In one aspect, example health checker rules may include a CPU, memory or disk load threshold (e.g., "if CPU utilization at a node exceeds 70%, flag as performance issue," "if memory usage at a node exceeds 20% of total RAM, flag as performance issue"), and software checking whether the product instance or a node crashed within some time defined by a policy, etc. (e.g., if object instance crashes after update within X amount of time, flag as functionality issue," "if node crashes after update within Y amount of time, flag as functionality issue," etc.). In one aspect, when performing a health check, update controller 104 may extract parameters of the software object instance or the nodes of an update wave over a period of time subsequent to updating the software object instance. These parameters may include, but are not limited to, CPU usage, RAM utilization, crash history, etc. Update controller 104 may then compare the parameters of the software object instance or the nodes to the criteria of the health checker rules.

In one aspect, update controller 104 has automated ways of detecting update failures by performing health checks on updated nodes. In a health check, update controller 104 monitors the state/health of an updated node and/or updated product instance. In some aspects, based on health checker rules/policies, update controller 104 may monitor any of: product instance health after update, physical node health after update, VM or CT health after update (if the node is a VM or a CT or if the node additionally has VMs or CTs), etc. In some aspects, when an updated instance or node is determined to have a health (e.g., functionality or performance) issue, update controller 104 automatically cancels the next update wave. In one aspect, user 402 may set up a threshold amount (or percent) of nodes and/or instances with such issues after which the current update installation is stopped and the next waves are cancelled. In one aspect, before launching next update wave, the controller performs a "health check" to ensure that current (and previous) update went fine.

Health checks may be performed by update controller 104 once an update has been completed on a node or after a some predefined time. A health check may include checking for node availability via a network (e.g., update controller 104 should be able to connect to an update agent on the node if the node has not crashed). Another health check may include checking for running services (e.g., if a service from some software package on a node was running before an update, the service should still be running after the update (there may be exceptions to this policy as indicated by user 402)). Another health check may include checking whether virtual environments are running, where virtual machines and containers, if any, should not be stopped by an update unless a node reboot is required. Other health checks may be for applications or web services running on a node (to ensure they are still functioning normally). In one aspect, product instance functionality and logs may also be checked.

In one aspect, if a functionality or performance issue is detected during a health check, update controller 104 reports the issue to user 402. User 402 may also be given an opportunity to confirm whether the update has an issue or whether the determination was a false positive. In some aspects, if an update does lead to an issue, a user may further provide instructions to update controller 104 on whether to halt deployment of the update or continue with the subsequent update waves.

In one aspect, upon detection of an issue on a set of nodes, the update may be rolled back/reverted on the set of nodes. For example, update controller 104 may issue a command to the corresponding update agents on the set of nodes to revert to a version of the software object instance prior to the update. Update controller 104 may do this automatically in some cases (e.g., by previously checking that it is possible and safe), or may notify user 402 such that in response to receiving a user confirmation, update controller 104 can issue the command to the relevant update agents. Checking whether rolling back is safe may include checking whether the node is not stopped (e.g., crashed) and is booted successfully, whether there is a safe rolling back scenario for this update (e.g., RPM packages usually do imply reverting to previous state), and whether the problem occurred after installation was completed (e.g., in some cases, like uncompleted updates, if there was a power off during update installation even the update agent cannot be sure what was performed during update and what was not).

In some aspects, update controller 104 may also report that a reboot is needed. More specifically, update controller 104 may, based on an update properties, determine whether a node reboot is required after an update at a node (e.g., if OS kernel is updated). In some aspects, depending on reboot policy, the node may be rebooted automatically and immediately or only upon approve of a user 402.

Figure 5:
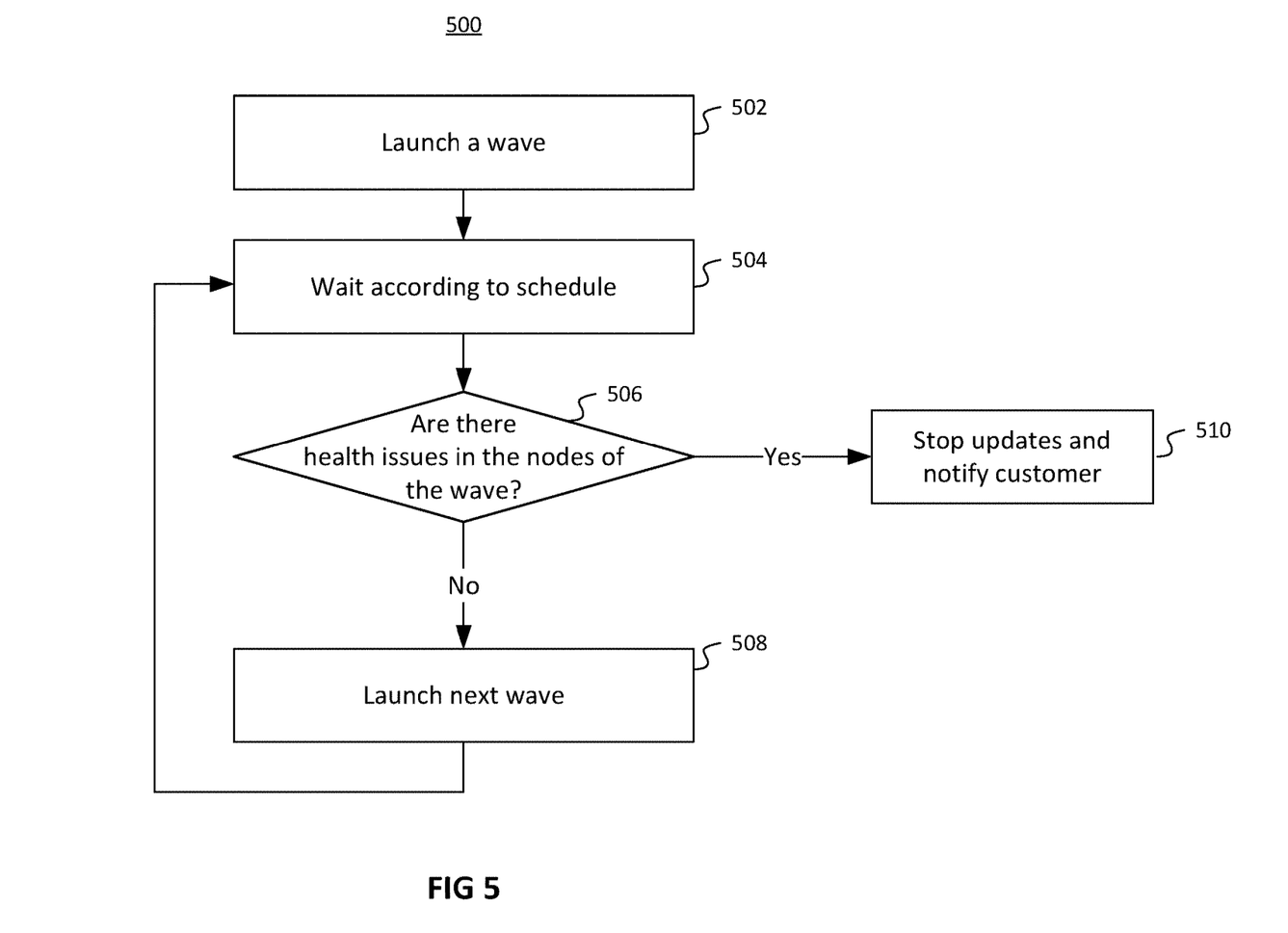
FIG. 5 illustrates a flow diagram of a method for launching update waves.

FIG. 5 illustrates a flow diagram of a method 500 for launching update waves. At 502, update controller 104 initiates an update wave (e.g., based on wave nodes distribution). Update controller 104 may specifically instruct each update agent on the nodes corresponding to the wave to install an update for software object instances on the respective nodes. At 504, update controller 104 waits according to an installation schedule. For example, update controller 104 determines whether a time period (corresponding to a second wave) has passed since an update was made available via product update repositories 208.

In some aspects, method 500 advances to 506, where update controller 104 determines whether health issues (i.e., functionality or performance issues) exist in the nodes of the update wave previously performed (e.g., update wave 1). In some aspects, update controller 104 may perform health checks immediately after updating a node in update wave 1. In other aspects, update controller 104 may perform health checks after a given period of time has passed (e.g., defined in a health checker rules, which may, for example, be shorter than the time till next wave). In yet other aspects, update controller 104 may perform health checks continuously over a period of time to detect any and/or the number of issues that arise in the nodes of the update wave.

In response to detecting a health issue in a node, method 500 proceeds to 510, where update controller 104 stops further updates in the update wave (and do not start other waves) and notifies the customer (e.g., user 402). In response to not detecting a health issue in nodes of the update wave, method 500 proceeds to 508 where update controller 104 launches the next update wave (e.g., update wave 2). Subsequently, method 500 returns to 504 as the loop continues until all update waves have been performed for a given update according to the schedule.

In some aspects, update controller 104 may initiate a first series of update waves for a first update. However, it is possible that a second update to the software object instance may be detected before all update waves for the first update have been performed. The second update may be, for example, a newer version or a bug fix, or a security update for the software object instance. In this situation, a second series of update waves associated with the second update may be initiated in parallel with the first series. In some aspects, if the first series comprises five update waves and three of them have been performed, when the fourth update wave begins, the second series of update waves may start. In some aspects, the second series of update waves may be initiated upon completion of the first series of update waves.

Figure 6:
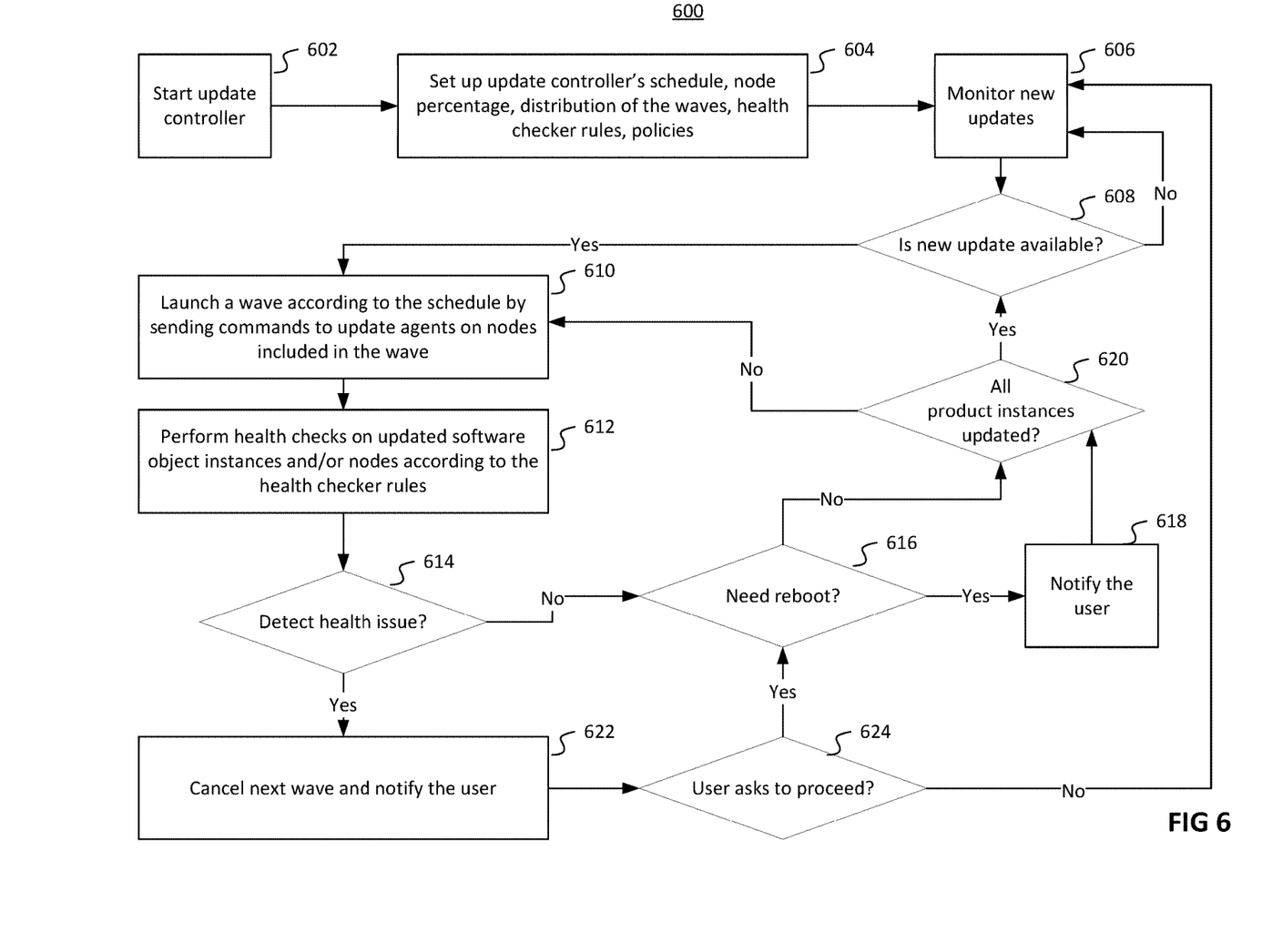
FIG. 6 illustrates a flow diagram of a method for launching update waves while interacting with a user.

FIG. 6 illustrates a flow diagram of a method 600 for launching update waves while interacting with a user. At 602, an update controller 104 is started on computing device 102N. In one aspect, as discussed before, a user may be registered on an update service and then provided with an update controller. The user may install update controller 104 on a computing device and may install a respective update agents on a set of nodes (computing devices, VMs, CTs, etc.).

At 604, update controller 104 may receive configurations from the user. For example, the user may set up update controller's schedule, node percentage, node distribution of the waves, health checker rules, policies, etc. At 606, update controller 104 monitors product update repositories 208 for updates to software object instances on nodes of the user. At 608, update controller 104 may determine whether a new update is available for a given software object instance. If no update is available, method 600 returns to 606.

If an update is available, method 600 advances to 610, where update controller 104 launches an update wave according to an installation schedule (which includes distribution of nodes for waves and wave periods) by sending commands to update agents on nodes included in the update wave. At 612, update controller 104 performs health checks on updated software object instances and/or nodes according to the health checker rules. At 614, update controller 104 evaluates whether an issue was detected based on the health checks. In some aspects, health checker determines that the update has functionality or performance issues (e.g., classifies that a health issue exists) if a number of nodes where issues have been detected is higher than a predefined threshold (e.g., 3%). In other aspects, update controller 104 only needs to detect one issue in an update wave before classifying that a health issue exists.

In some aspects, if a health issue is detected, method 600 proceeds to 622, where update controller 104 cancels the next update wave and notifies the user. At 624, update controller 104 receives a user command on whether to proceed despite the health issue detection. If the user does not want to proceed, method 600 returns to 606, where update controller 104 monitors for newer updates. In this case, an update that causes health issues is not installed on other nodes.

In some aspects, either the user will still want to proceed (on step 624) or no health issue may be detected (on step 614). Thus, method 600 proceeds to 616, where update controller 104 determines whether a reboot is needed. If a reboot is required, method 600 proceeds to 618, where update controller 104 generates a notification for the user that a reboot is needed. If no reboot is needed, method 600 proceeds to 620, where update controller 104 determines whether all software object instances have been updated. If not, method 600 returns to 610 where the next update wave is launched (e.g., when its time comes) according to the schedule. Otherwise, method 600 returns to 608 where the next update to a software object instance is monitored.

Figure 7:
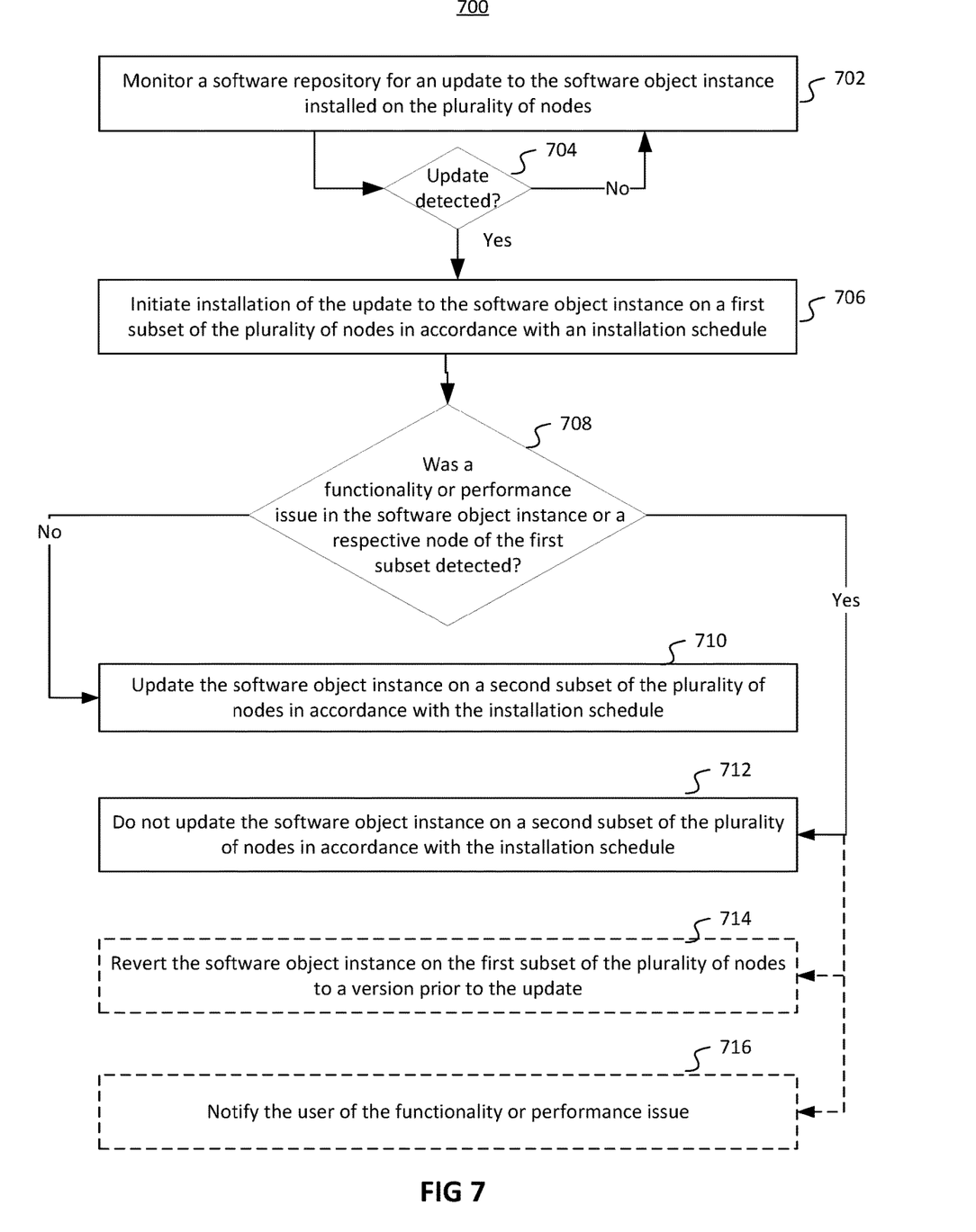
FIG. 7 illustrates a flow diagram of a method for updating software object instances on a plurality of nodes.

FIG. 7 illustrates a flow diagram of a method 700 for updating a software object instance on a plurality of nodes. At 702, update controller 104 monitors a software repository for an update to the software object instance installed on the plurality of nodes. At 704, update controller 104 determines whether an update was detected. In response to detecting an update, at 706, update controller 104 initiates installation of the update to the software object instance on a first subset of the plurality of nodes in accordance with an installation schedule. Otherwise, method 700 returns to 702. At 708, update controller 104 determines whether a functionality or performance issue in the software object instance or a respective node of the first subset is detected. If an issue is not detected, method 700 advances to 710, where update controller 104 updates the software object instance on a second subset of the plurality of nodes in accordance with the installation schedule.

However, if an issue is detected, at 712, update controller 104 halts updating the software object instance on a second subset of the plurality of nodes in accordance with the installation schedule. In some aspects, at 714, update controller 104 reverts the software object instance on the first subset of the plurality of nodes to a version prior to the update. In some aspects, at 716, update controller 104 notifies the user of the functionality or performance issue.

Figure 8:
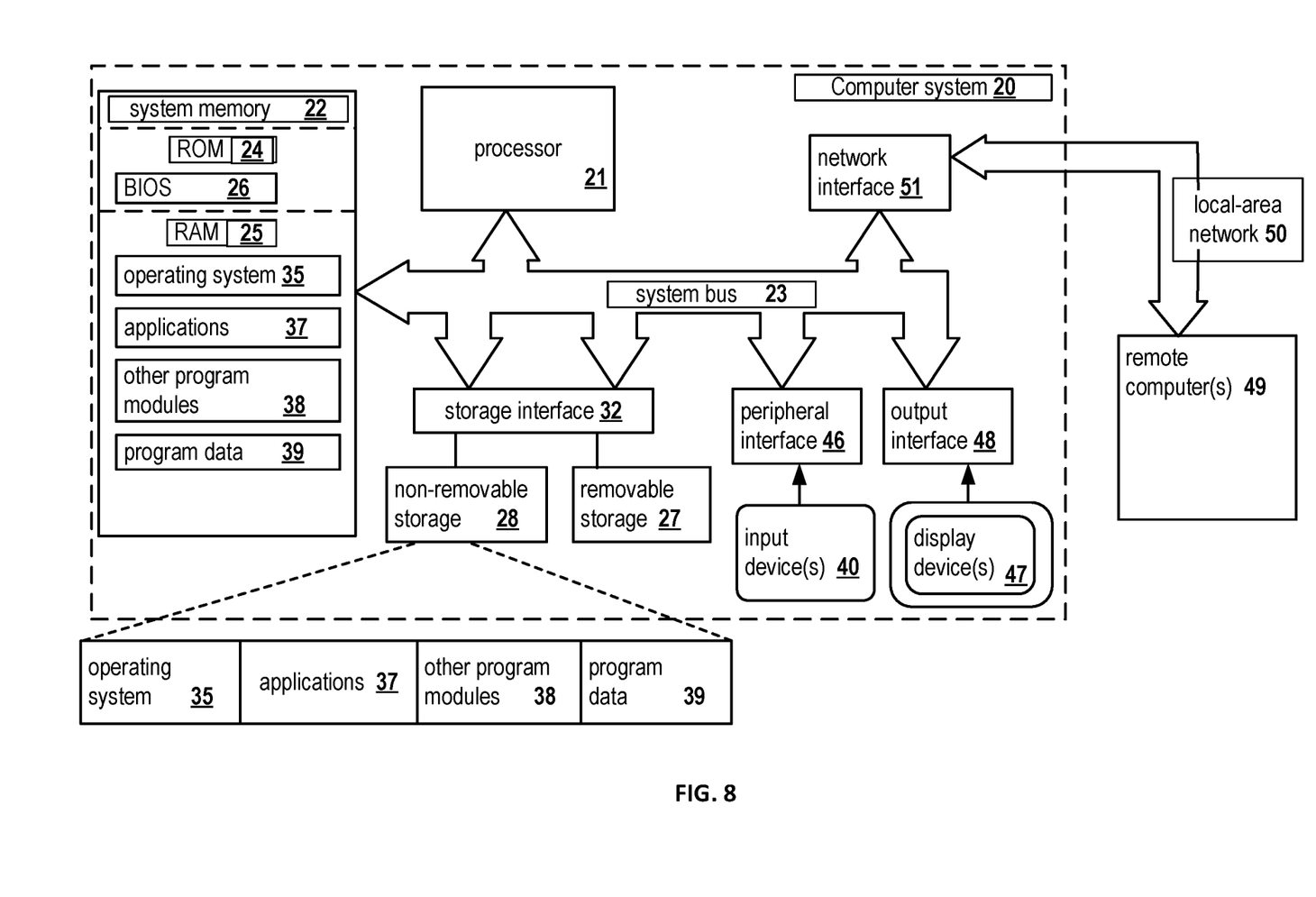
FIG. 8 presents an example of a general-purpose computer system on which aspects of the present disclosure can be implemented.

FIG. 8 is a block diagram illustrating a computer system 20 on which aspects of systems and methods for updating software object instances on a plurality of computing devices may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I2C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-7 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for applying updates to a plurality of instances of a software component running on a plurality of communicatively coupled computing devices, the method comprising, by at least one update controller running on at least one of the plurality of communicatively coupled computing devices:
   starting, in response to detecting a first update to the software component, to apply the first update to two or more subsets of the plurality of instances at two or more respective moments of time according to a first installation schedule corresponding to the first update;
   wherein applying the first update to a particular subset of the two or more subsets comprises communicating to computing devices, where instances belonging to the particular subset are running, to initiate applying the first update to the instances belonging to the particular subset;

during applying the first update to the two or more subsets according to the first installation schedule corresponding to the first update, performing at least one health check of at least one subset, and determining, based on results of the at least one health check, whether to proceed with applying the first update to at least one other subset according to the first installation schedule corresponding to the first update, or to stop applying the first update;

concurrently with the first installation schedule, starting, in response to detecting a second update that is newer than the first update, to apply the second update to the software component at the two or more subsets of the plurality of instances according to a second installation schedule corresponding to the second update, without waiting to finish applying the first update according to the first installation schedule corresponding to the first update.

2. The method of claim 1, wherein performing the at least one health check of the at least one subset comprises:

after applying the first update to the at least one subset, communicating to the computing devices, where the instances belonging to the at least one subset are running, to retrieve information about functionality or performance of at least one of: the instances and the computing devices where the instances belonging to the at least one subset are running; and determining, based on the retrieved information, whether functionality or performance issues occurred after initiation of applying the first update to the at least one subset.

3. The method of claim 2, further comprising in response to determining that the functionality or performance issues occurred after the initiation of applying the first update to the at least one subset, not applying the first update to at least one other subset of the plurality of instances.

4. The method of claim 2, wherein performing the at least one health check further comprises:

extracting attributes of the instances belonging to the at least one subset, to which the first update was applied, or of the computing devices, where the instances belonging to the at least one subset are running, over a period of time subsequent to applying the first update; and comparing the extracted attributes to criteria of health checker rules, wherein the health checker rules indicate whether the functionality or performance issues occurred.

5. The method of claim 1, wherein the first installation schedule corresponding to the first update indicates time latencies between applying the first update to the two or more subsets of the plurality of instances.

6. The method of claim 1, wherein the first installation schedule corresponding to the first update indicates which instances of the plurality of instances belong to which subsets.

7. The method of claim 1, wherein communicating to the computing devices to initiate applying the first update comprises:

sending corresponding commands to update agents running on the computing devices.

8. The method of claim 1, further comprising monitoring a software repository for updates to the software component.

9. The method of claim 2, further comprising in response to determining that the functionality or performance issues occurred, reverting a state of the instances belonging to the at least one subset, to which the first update was applied, to a version prior to the first update.

10. The method of claim 2, further comprising:

in response to determining that the functionality or performance issues occurred, notifying a user of the functionality or performance issues; and in response to determining that a reboot of at least one computing device is needed, notifying the user and rebooting the at least one computing device subsequent to applying the first update to instances running on the at least one computing device.

11. The method of claim 1, wherein the first installation schedule and the second installation schedule run in parallel, and wherein the second update is installed on other subsets of the plurality of instances based on results of at least one other health check performed on the two or more subsets subsequent to installing the second update.

12. A system for applying updates to a plurality of instances of a software component running on a plurality of communicatively coupled computing devices, the system comprising:

one or more hardware processors configured to:

start, in response to detecting a first update to the software component, to apply the first update to two or more subsets of the plurality of instances at two or more respective moments of time according to a first installation schedule corresponding to the first update;

wherein applying the first update to a particular subset of the two or more subsets comprises communicating to computing devices, where instances belonging to the particular subset are running, to initiate applying the first update to the instances belonging to the particular subset;

during applying the first update to the two or more subsets according to the first installation schedule corresponding to the first update, perform at least one health check of at least one subset, and determining, based on results of the at least one health check, whether to proceed with applying the first update to at least one other subset according to the first installation schedule corresponding to the first update, or to stop applying the first update;

concurrently with the first installation schedule, start, in response to detecting a second update that is newer than the first update, to apply the second update to the software component at the two or more subsets of the plurality of instances according to a second installation schedule corresponding to the second update, without waiting to finish applying the first update according to the first installation schedule corresponding to the first update.

13. The system of claim 12, wherein the one or more hardware processors are configured to perform the at least one health check of the at least one subset by:

after applying the first update to the at least one subset, communicating to the computing devices, where the instances belonging to the at least one subset are running, to retrieve information about functionality or performance of at least one of: the instances and the computing devices where the instances belonging to the at least one subset are running; and determining, based on the retrieved information, whether functionality or performance issues occurred after initiation of applying the first update to the at least one subset.

14. The system of claim 13, wherein the one or more hardware processors are configured to in response to determining that the functionality or performance issues occurred after the initiation of applying the first update to the at least one subset, not apply the first update to at least one other subset of the plurality of instances.

15. The system of claim 13, wherein the one or more hardware processors are configured to perform the at least one health check by:
   extracting attributes of the instances belonging to the at least one subset, to which the first update was applied, or of the computing devices, where the instances belonging to the at least one subset are running, over a period of time subsequent to applying the first update; and
   comparing the extracted attributes to criteria of health checker rules, wherein the health checker rules indicate whether the functionality or performance issues occurred.

16. The system of claim 12, wherein the first installation schedule corresponding to the first update indicates time latencies between applying the first update to the two or more subsets of the plurality of instances.

17. The system of claim 12, wherein the first installation schedule corresponding to the first update indicates which instances of the plurality of instances belong to which subsets.

18. The system of claim 12, wherein the one or more hardware processors are configured to communicate to the computing devices to initiate applying the first update by:
   sending corresponding commands to update agents running on the computing devices.

19. The system of claim 12, wherein the one or more hardware processors are configured to monitor a software repository for updates to the software component.

20. The system of claim 13, wherein the one or more hardware processors are configured to in response to determining that the functionality or performance issues occurred, revert a state of the instances belonging to the at least one subset, to which the first update was applied, to a version prior to the first update.

21. A non-transitory computer readable medium storing thereon computer executable instructions for applying updates to a plurality of instances of a software component running on a plurality of communicatively coupled computing devices, including instructions for:
   starting, in response to detecting a first update to the software component, to apply the first update to two or more subsets of the plurality of instances at two or more respective moments of time according to a first installation schedule corresponding to the first update;
   wherein applying the first update to a particular subset of the two or more subsets comprises communicating to computing devices, where instances belonging to the particular subset are running, to initiate applying the first update to the instances belonging to the particular subset;
   during applying the first update to the two or more subsets according to the first installation schedule corresponding to the first update, performing at least one health check of at least one subset, and determining, based on results of the at least one health check, whether to proceed with applying the first update to at least one other subset according to the first installation schedule corresponding to the first update, or to stop applying the first update;
   concurrently with the first installation schedule, starting, in response to detecting a second update that is newer than the first update, to apply the second update to the software component at the two or more subsets of the plurality of instances according to a second installation schedule corresponding to the second update, without waiting to finish applying the first update according to the first installation schedule corresponding to the first update.

* * * * *